(12) United States Patent
Stancil et al.

(10) Patent No.: US 11,714,501 B2
(45) Date of Patent: Aug. 1, 2023

(54) DIGITAL PEN HOLDER

(71) Applicant: Hewlett-Packard Development Company, L.P., Spring, TX (US)

(72) Inventors: Charles J. Stancil, Spring, TX (US); Derek Kanas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/419,739

(22) PCT Filed: Jul. 25, 2019

(86) PCT No.: PCT/US2019/043344
§ 371 (c)(1),
(2) Date: Jun. 30, 2021

(87) PCT Pub. No.: WO2021/015771
PCT Pub. Date: Jan. 28, 2021

(65) Prior Publication Data
US 2022/0147159 A1 May 12, 2022

(51) Int. Cl.
*G06F 3/039* (2013.01)
*G06F 1/16* (2006.01)
*G06F 3/0354* (2013.01)

(52) U.S. Cl.
CPC .......... *G06F 3/039* (2013.01); *G06F 1/1656* (2013.01); *G06F 3/03545* (2013.01); *G06F 2200/1632* (2013.01)

(58) Field of Classification Search
None
See application file for complete search history.

(56) References Cited

U.S. PATENT DOCUMENTS

| 8,064,193 | B2 | 11/2011 | Thabit |
| 9,575,579 | B2* | 2/2017 | Ashcraft ............... G06F 3/0393 |
| 10,198,090 | B2 | 2/2019 | Maeshima |
| 2002/0021290 | A1 | 2/2002 | Mitsuya |
| 2002/0074171 | A1 | 6/2002 | Nakano et al. |
| 2004/0261392 | A1* | 12/2004 | Oishi ...................... B21L 9/065 59/4 |
| 2006/0244737 | A1 | 11/2006 | Dodge |
| 2011/0289739 | A1 | 12/2011 | Diehl |
| 2015/0220114 | A1 | 8/2015 | Reznik |
| 2015/0286298 | A1* | 10/2015 | Lee ..................... G06F 3/03545 345/179 |

FOREIGN PATENT DOCUMENTS

| CN | 206154963 U | 5/2017 |
| DE | 202008017711 U1 | 4/2010 |
| KR | 101928955 B1 | 12/2018 |
| WO | WO-2002081230 A1 | 10/2002 |

OTHER PUBLICATIONS

Microsoft, Surface Pro 3 features, Feb. 28, 2019, Microsoft, 6 pages.
Wacom, Replace the pen nib, Apr. 12, 2017, Wacom, 14 pages.

* cited by examiner

*Primary Examiner* — Xuyang Xia
(74) *Attorney, Agent, or Firm* — Knobbe, Martens, Olson & Bear, LLP

(57) ABSTRACT

An example digital pen holder can include a fastener to attach a digital pen to the digital pen holder, an integrated pen tip storage, and an integrated pen tip extractor.

13 Claims, 4 Drawing Sheets

DIGITAL PEN HOLDER

BACKGROUND

A digital pen, which can include an active pen in some examples, includes electronic components and allows users to write directly onto a display of a computing device. A digital pen can capture the handwriting or brush strokes of a user and converts handwritten analog information into digital data, enabling the data to be utilized in a plurality of applications.

DETAILED DESCRIPTION

Figure 1:
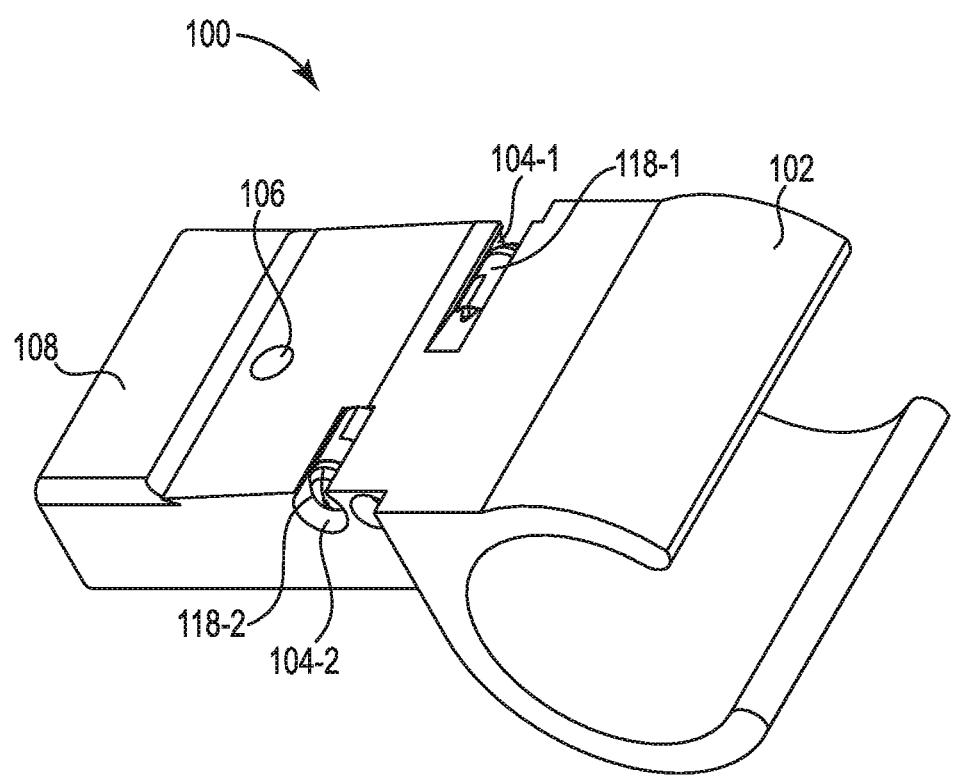
FIG. 1 is a diagram of a digital pen holder according to an example.

Demand for digital pens increases as more computing devices support pen input. A digital pen, as used herein, can include an input device for writing on a display of a computing device. A digital pen, for example, can include an active pen, stylus, positional pen, capacitive pen (e.g., multi-touch compatible pen), smart pen, accelerometer pen, camera pen, trackball pen, or other pen device used for writing or converting handwritten analog information into digital data. In some examples, a digital pen is passive (also known as "inactive") such that it lacks electrical components. A digital pen can include a removeable and/or replaceable pen tip (also known as a "nib"). While a digital pen is described herein, other writing utensils to be stored with an associated computing device may be used. As used herein, a computing device can be a mechanical or electrical device that transmits or modifies energy to perform or assist in the performance of human tasks. Examples include personal computers, laptops, tablets, smartphones, mobile devices, digital notebooks, printing devices, and gaming consoles, among others.

Digital pens may be provided to users along with spare pen tips because pen tips may wear out after a period of use. A tool may also be provided with the digital pen for removal of a pen tip from the digital pen prior to pen tip replacement. These parts (e.g., pen tips and extraction tools) may be small and easy to misplace or lose. This can result in user dissatisfaction resulting from an inability to use the digital pen without ordering new pen tips or extraction tools upon loss of originally shipped pen tips and/or extraction tools.

In contrast, examples of the present disclosure provide for a digital pen holder having integrated pen tip storage and an integrated pen tip extractor. Such a digital pen holder can be used to store a digital pen near an associated computing device while reducing potential misplacement or loss of pen tips and/or pen tip extraction tools. For instance, because pen tip storage and an extraction tool are integrated in the digital pen holder, pen tips and extraction tools are no longer loose parts to be lost or misplaced. Additionally, examples of the present disclosure provide the digital pen holder to hold the digital pen while the digital pen holder is attached to an associated computing device. As a result, the digital pen, spare pen tips, and pen tip extraction tool may be stored securely with the associated computing device.

The figures herein follow a numbering convention in which the first digit or digits correspond to the drawing figure number and the remaining digits identify an element or component in the drawing. Similar elements or components between different figures may be identified by the use of similar digits. For example, 104 may reference element "06" in FIG. 1, and a similar element may be referenced as 206 in FIG. 2. Multiple analogous elements within one figure may be referenced with a reference numeral followed by a hyphen and another numeral or a letter. For example, 104-1 may reference element 04-1 in FIGS. 1 and 104-2 may reference element 04-2, which can be analogous to element 04-1. Such analogous elements may be generally referenced without the hyphen and extra numeral or letter. For example, elements 104-1 and 104-2 may be generally referenced as 104.

Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

FIG. 1 is a diagram of a digital pen holder 100 according to an example. Digital pen holder 100 can include a fastener 102 to attach a digital pen to the digital pen holder 100. Fastener 102 can include, for instance, a flexible pen clip, a C-clip, or other similar fastening element to hold the digital pen. In some examples, the digital pen holder 100 can include integrated pen tip storage 104. Two integrated pen tip storage locations 104-1, 104-2 are illustrated in FIG. 1, but more or fewer locations may be present. The integrated pen tip storage 104 can store pen tips 118-1, 118-2 when not in use (e.g., when not installed in the digital pen).

In some instances, the digital pen holder 100 can include an integrated pen tip extractor 106, One integrated pen tip extractor 106 is illustrated in FIG. 1, but more integrated pen tip extractors may be present on the digital pen holder 100 and/or may be in different locations on the digital pen holder 100 (e.g., on a portion of a connector 108, on a portion of the fastener 102, etc.). The integrated pen tip extractor 106 can be used for removal of a pen tip from a digital pen. For instance, when a pen tip is due for replacement (e.g., due to wear), the pen tip to be replaced can be extracted from the digital pen using the integrated pen tip extractor 106.

The digital pen holder 100 can include a connector 108 to attach to a computing device, in some examples. The connector 108 can include some or all of the portion of the digital pen holder 100 that is not the fastener 102. In some examples, the connector 108 can provide for attachment to a port of a computing device. For instance, the connector 108 can be inserted into a port of the computing device. Such a port can include a universal serial bus (USB) type A port, a USB type C port, a smart card port, a high definition multimedia interface (HDMI) port, display port, slot (e.g., a cable lock slot), or other port and/or opening available on the computing device. In some examples the connector 108 attaches to the computing device via an adhesive material, a magnetic attachment, a tether, and/or other attachment method.

In some examples, the integrated pen tip storage 104 is located on a portion of the connector 108. In such an example, when the connector 108 is inserted into a port of an associated computing device the integrated pen tip storage 104 is located in the port of the computing device. Similar, when the integrated pen tip extractor 106 is located on a portion of the connector 108, the integrated pen tip extractor 106 is located in the port of the computing device. This can protect the integrated pen tip storage 104 (and stored pen tips 118) and the integrated pen tip extractor 106 from damage or loss, in some examples.

Figure 2:
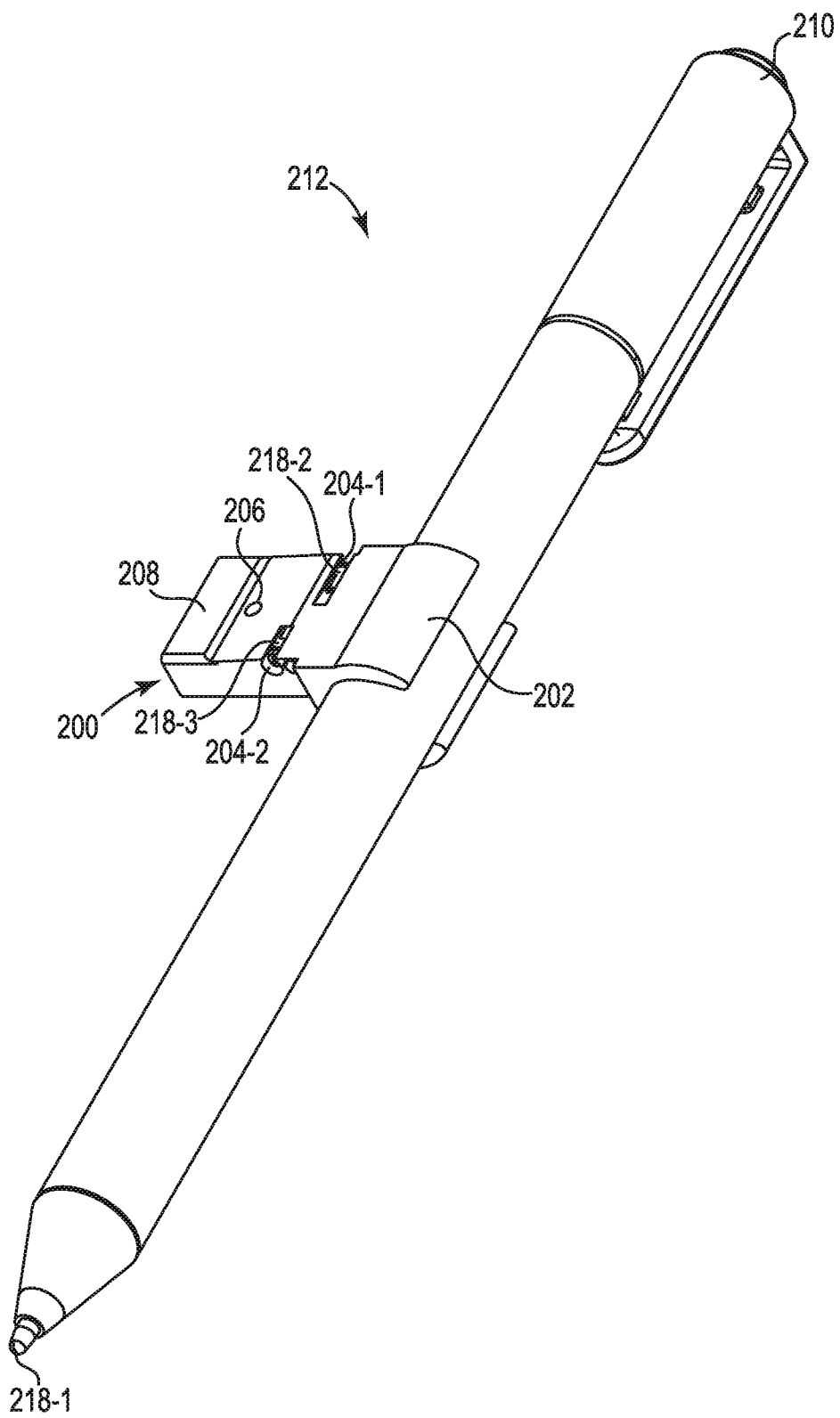
FIG. 2 is a diagram of an assembly including a digital pen and a digital pen holder according to an example.

FIG. 2 is a diagram of an assembly 212 including a digital pen 210 and a digital pen holder 200 according to an example. The digital pen holder 200 can include a connector 208 to attach to a computing device and a fastener 202 to attach the digital pen 210 to the digital pen holder 200. The fastener 202 can hold the digital pen 210 in a fixed position when attached to the fastener 202. For instance, the C-clip shape of the fastener 202 illustrated in FIG. 2, allows for a user to use a small amount of force to press the digital pen 210 into the fastener 202, where the digital pen 210 remains in a fixed position and attached to the fastener 202 until removed from the C-clip shaped fastener 202. While a C-clip shaped fastener 202 is illustrated in FIG. 2, other fastener types may be used, for instance a flexible pen clip fastener. In some examples, the fastener 202 is shaped to hold only a portion of the digital pen 210. For instance, a center side portion of the digital pen 210 is held in FIG. 2 by fastener 202.

In some examples, the connector 208 can attach the assembly 212 to a computing device by connecting to a port of the computing device, by magnetically attaching to the computing device, or by attaching to the computing device via an adhesive material. For instance, the assembly 212 can be attached to a USB port (e.g., type A, type C, etc.) of a notebook computer with which the digital pen 210 is associated. By doing so, the digital pen 210, spare pen tips 218-2, 218-3 (e.g., stored in integrated pen tip storage 204), and the integrated pen tip extractor 206 can be stored with an associated computing device in one location without loose parts.

The digital pen holder 200 can also include integrated storage 204-1, 204-2 for a plurality of pen tips 218-2, 218-3 and an integrated pen tip extractor 206. The integrated pen tip extractor 206 can be used to remove a pen tip 218-1 from the digital pen 210 when it is due for replacement. For instance, if the pen tip 218-1 is worn down and not performing as desired, the pen tip 218-1 can be placed in the integrated pen tip extractor 206, and the digital pen 210 can be removed for extraction of the pen tip 218-1. A spare pen tip 218-2 or 218-3 may be removed from the integrated pen tip storage 204 and placed in the digital pen 210. The integrated pen tip storage 204 and the integrated pen tip extractor 206 reduce loose parts (e.g., pen tips, extraction tools) associated with the digital pen 210, which can prevent loss and/or misplacement of such loose parts.

Figure 3:
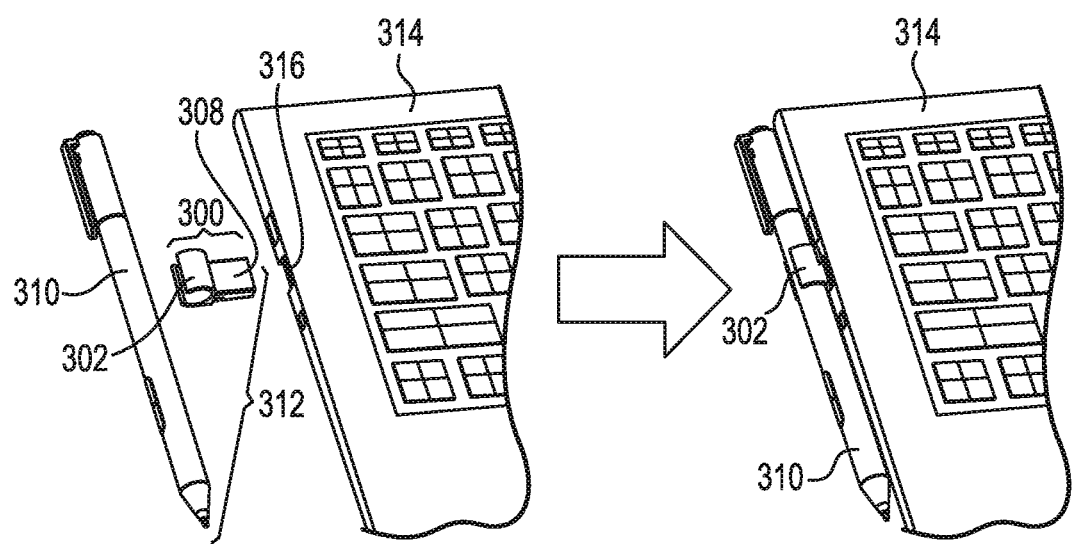
FIG. 3 is a diagram of an assembly including a digital pen and a digital pen holder attachable to a computing device according to an example.

FIG. 3 is a diagram of an assembly 312 including a digital pen 310 and a digital pen holder 300 attachable to a computing device 314 according to an example. FIG. 3 illustrates the digital pen holder 300 with a connector 308 to attach to a port 316 of the computing device 314. Connector 308, for example, can be shaped to fit (e.g., fit snuggly) in the port 316. For instance, if the port 316 is a USB type-A port, connector 308 may be shaped to fit that particular port. The connector 308 can be different shapes based on the port 316 (e.g., USB-type C, HDMI, smart card, display port, slot, etc.). The digital pen 310 can attach to fastener 302 of the digital pen holder 300 before or after attachment of the connector 308 to the port 316 of the computing device 314. While the digital pen 310 is shown attached to the computing device 314 via the port 316 in FIG. 3, other attachment configurations may be used.

Figure 4:
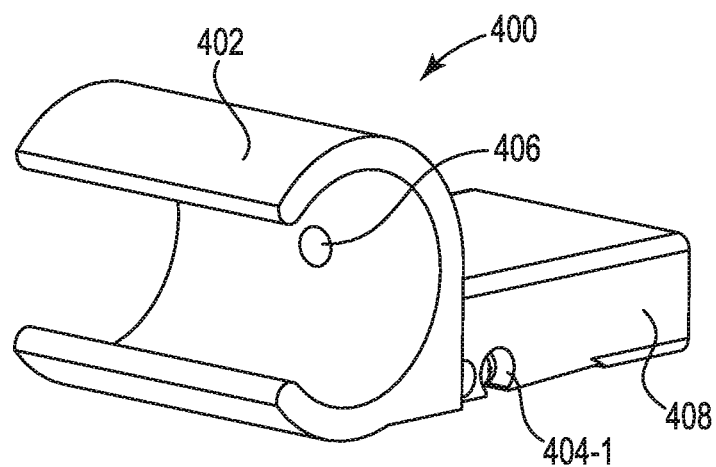
FIG. 4 is another diagram of a digital pen holder according to an example.

FIG. 4 is another diagram of a digital pen holder 400 according to an example. The digital pen holder 400 includes a fastener 402 to attach a digital pen to the digital pen holder 400, integrated pen tip storage 404, and a connector 408 to attach the digital pen holder 400 to a computing device. In some examples, the digital pen holder 400 includes an integrated pen tip extractor 406 located on a portion of the fastener 402. For instance, in the example illustrated in FIG. 4, the fastener 402 is a C-clip fastener and the integrated pen tip extractor 406 is located on the interior curve of the C-clip fastener 402. This location, for instance, can protect the integrated pen tip extractor 406 from dust, dirt, etc., as it is protected by the curves of the C-clip fastener 402, and/or by the digital pen when the digital pen is stored in the fastener 402.

Figure 5:
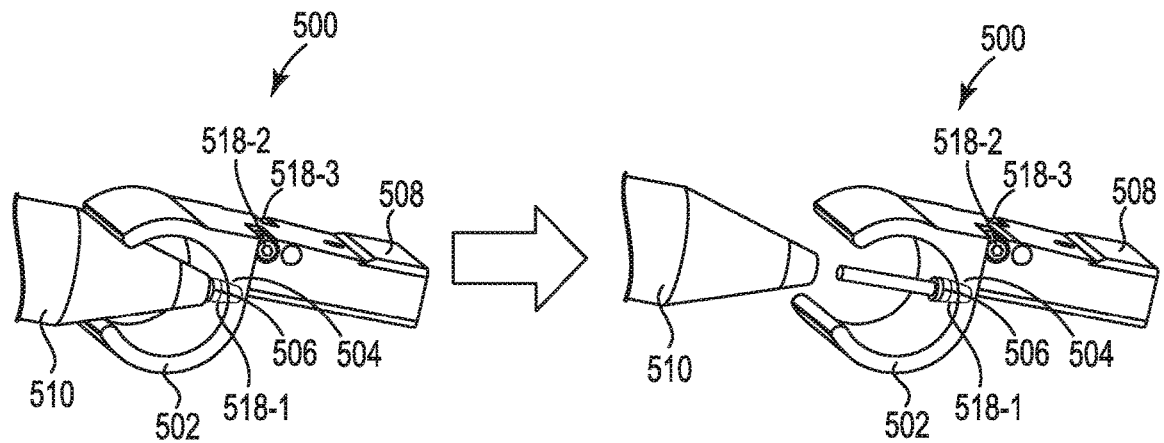
FIG. 5 illustrates removal of a pen tip from a digital pen according to an example.

FIG. 5 illustrates removal of a pen tip 518 from a digital pen 510 according to an example. When a pen tip, such as pen tip 518-1, of a digital pen, such as digital pen 510, wears out, it can be removed and replaced. FIG. 5 illustrates digital pen 510 and pen tip 518-1 inserted into an integrated pen tip extractor 506. The integrated pen tip extractor holds onto pen tip 518-1, and as digital pen 510 is removed, pen tip 518-1 is extracted. A replacement pen tip 518-2 or 518-3 (e.g., stored in integrated pen tip storage 504) can be inserted into the digital pen 510 where the previous pen tip 518-1 was removed. In some examples, the integrated pen tip extractor 506 may be used to insert the replacement pen tip 518-1 or 518-2. For instance, replacement pen tip 518-2 can be placed inside the integrated pen tip extractor 506 and the digital pen 510 can be pushed onto the replacement pen tip 518-2 with sufficient pressure to force the replacement pen tip 518-2 into the digital pen 510.

The integrated pen tip extractor 506 can be located in a portion of the fastener 502 as illustrated in FIG. 5 but may be located elsewhere on the digital pen holder 500 in some instances. For example, the integrated pen tip extractor 506 may be located on a portion of the connector 508. In such an example, pen tip 518-1 can be inserted into the integrated pen tip extractor 506 located on the portion of the connector 508 and extracted in a similar manner to that illustrated in FIG. 5.

Figure 6:
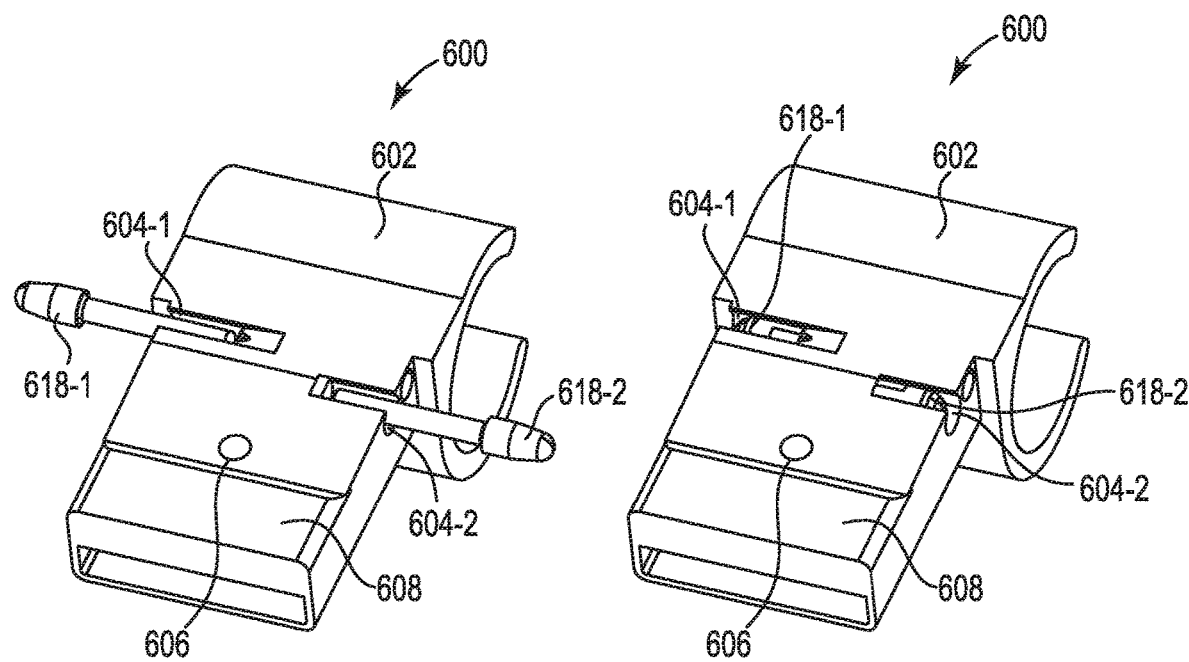
FIG. 6 is yet another diagram of a digital pen holder according to an example.

FIG. 6 is yet another diagram of a digital pen holder 600 according to an example. The digital pen holder 600 can include a fastener 602 to attach a digital pen to the digital pen holder 600, integrated pen tip storage 604, and an integrated pen tip extractor 606. While the integrated pen tip storage 604 and the integrated pen tip extractor 606 are illustrated on the topside of the digital pen holder 600, examples are not so limited. The integrated pen tip storage 604, the integrated pen tip extractor 606, or both may be located on the underside of the digital pen holder 600. For instance, the location of the integrated pen tip storage 604 and/or the integrated pen tip extractor 606 may be dependent on the shape and/or size of a receiving port of a connector 608. For example, the digital pen holder 600 can include the connector 608 to attach to a computing device. The connector 608 can attach via the aforementioned port of the computing device (e.g., USB-type A, USB-type C, HDMI, smart card, display port, eta), via an adhesive material, magnetically, or via a tether, among other attachment mechanisms.

The digital pen holder 600 includes two locations 604-1, 604-2 of integrated pen tip storage. In some examples, the integrated pen tip storage is located on a portion of the connector 608, such that when inserted into a port of a computing device, the integrated pen tip storage 604 is located inside (and protected by) the receiving port of the computing device. The digital pen holder 600 and/or the connector 608 can have thicknesses such that they can support the size of the pen tips 618 stored in the integrated pen tip storage 604.

While two locations are located in FIG. 6, more or few integrated pen tip storage locations may be present on the digital pen holder 600. In some examples, pen tips 618-1 and 618-2 can be pushed into the integrated pen tip storage 604 using pressure such that they are friction fit into the integrated pen tip storage 604. For instance, the integrated pen tip storage 604 may be slightly smaller than a pen tip 618, such that with pressure, the pen tip 618 can slide into the integrated pen tip storage 604 and remain until a pulling pressure is used to remove the pen tip 618.

In some instances, the integrated pen tip storage 604 can be grooved or recessed to receive and store the pen tips 618. When stored in the integrated pen tip storage 604, the pen tips 618 are held in a fixed position, Pen tips 618 may be removed from the integrated pen tip storage 604 by pulling on the pen tip to remove it. Other insertion and removal methods may be used in some examples.

In some examples, the integrated pen tip extractor 606, which is located on a portion of the connector 608, can be protected from dust, dirt, etc. when it is attached to a port of a computing device. In some examples, the integrated pen tip extractor 606 is covered by the interior of the associated port because the connector 608 is inserted partially or fully into the port of the computing device. In some examples, digital pen holder 600 can be composed of plastic, rubber, thermoplastic polyurethane (TPU), a combination thereof, or other materials rigid enough to hold the digital pen securely and remain attached securely to the associated computing device, but flexible enough to receive the digital pen to the fastener 102.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure,

What is claimed is:

1. A digital pen holder, comprising:
   a connector to attach to a computing device;
   a fastener to attach a digital pen to the digital pen holder, the fastener coupled to the connector;
   a pen tip storage integrated into the connector; and
   a pen tip extractor integrated into the connector.

2. The digital pen holder of claim 1, further comprising the pen tip extractor located on a portion of the connector.

3. The digital pen holder of claim 1, further comprising the pen tip extractor located on a portion of the fastener.

4. A digital pen holder, comprising:
   a connector to attach to a port of a computing device;
   a fastener to attach a digital pen to the digital pen holder, the fastener coupled to the connector;
   a pen tip storage integrated into the connector; and
   a pen tip extractor integrated into the connector.

5. The digital pen holder of claim 4, further comprising the connector to attach to a Universal Serial Bus port of the computing device.

6. The digital pen holder of claim 4, further comprising the connector to attach to a smart card port of the computing device.

7. The digital pen holder of claim 4, further comprising the connector to attach to a high definition multimedia interface (HDMI) port of the computing device.

8. An assembly, comprising:
   a digital pen; and
   a digital pen holder, comprising;
      a connector to attach to a computing device;
      a fastener coupled to the connector and to attach the digital pen to the digital pen holder and hold the digital pen in a fixed position when attached to the fastener;
      a storage to store a plurality of pen tips integrated into the connector; and
      a pen tip extractor integrated into the connector.

9. The assembly of claim 8, further comprising the connector to magnetically attach to the computing device.

10. The assembly of claim 8, further comprising the connector to attach to the computing device via an adhesive material.

11. The assembly of claim 8, wherein the fastener is shaped to hold only a portion of the digital pen.

12. The assembly of claim 8, wherein the fastener is a flexible pen clip.

13. The assembly of claim 8, wherein the fastener is a C-clip.

* * * * *